US007029547B2

(12) United States Patent
Biller

(10) Patent No.: US 7,029,547 B2
(45) Date of Patent: Apr. 18, 2006

(54) METHOD OF EMBOSSING CARDS

(75) Inventor: Richard L. Biller, Deerfield, IL (US)

(73) Assignee: Production Services Associates, Inc., Deerfield, IL (US)

( * ) Notice: Subject to any disclaimer, the term of this patent is extended or adjusted under 35 U.S.C. 154(b) by 426 days.

(21) Appl. No.: 10/678,832

(22) Filed: Oct. 3, 2003

(65) Prior Publication Data

US 2005/0028922 A1 Feb. 10, 2005

Related U.S. Application Data

(60) Provisional application No. 60/492,951, filed on Aug. 6, 2003.

(51) Int. Cl.
*B29C 59/02* (2006.01)

(52) U.S. Cl. ........................ 156/219; 156/267; 156/277

(58) Field of Classification Search ................ 156/209, 156/219, 267, 277, 553, 510; 264/293, 297.8
See application file for complete search history.

(56) References Cited

U.S. PATENT DOCUMENTS

| | | | | |
|---|---|---|---|---|
| 3,461,581 A * | 8/1969 | Hoffmann | 283/107 |
| 4,999,075 A * | 3/1991 | Coburn, Jr. | 156/209 |
| 2004/0144472 A1* | 7/2004 | Cowie | 156/64 |

* cited by examiner

*Primary Examiner*—Sam Chuan Yao
*Assistant Examiner*—Barbara J Musser
(74) *Attorney, Agent, or Firm*—McAndrews, Held & Malloy

(57) ABSTRACT

A card embossing system for embossing information onto a sheet of material prior to cutting individual cards from the sheet is disclosed. Information is embossed onto the sheet in a pattern of rows and columns. Information on adjacent columns is offset relative to one another. When individual cards are cut from the sheet, they are collected in a receiving tray having a plurality of cells arranged in a pattern of rows and columns such that adjacently stacked cards have embossing which is offset from one another. This prevents nesting of cards and allows for improved feeding from a hopper into a machine for further processing, such as printing or embossing individualized information on each card.

16 Claims, 5 Drawing Sheets

METHOD OF EMBOSSING CARDS

CROSS-REFERENCE TO RELATED APPLICATIONS

This application claims the benefit of U.S. Provisional Patent Application No. 60/492,951, filed Aug. 6, 2003, which is hereby incorporated by reference in its entirety.

FIELD OF THE INVENTION

The present invention relates to embossing systems for cards, and more specifically to a system for embossing a sheet of cards.

BACKGROUND OF THE INVENTION

Printing and embossing credit, identification, promotional, or similar type cards has been practiced for some time. The current practice for making cards of this type generally involves first printing information onto a sheet of cards, using an inkjet or similar type printer. The printed information is typically static information, that is, the same information is printed on each card. Next, an ultraviolet coat or a lamination layer is applied to the sheet of cards. Third, individual cards are punched or cut from the sheet. Lastly, the cards are embossed with static information or individualized information. When static information is to be embossed on the cards, the process to emboss static information is costly and time consuming. Using the current practice, static information is embossed one character, letter, or image at a time, or must be altered for each card. Additionally, the static information for each card must be programmed individually, taking up valuable computer space and programmer time.

Several U.S. Patents have been granted on variations and improvements to machines that follow the current practice. For example, U.S. Pat. Nos. 4,088,216, 4,271,012, 4,784,059, 4,789,420, 4,969,760, 5,505,514, and 6,142,370, all issued to LaManna et al. (collectively, the LaManna Patents), disclose embossing systems that use rotating embossing wheels and a transport mechanism to emboss a desired character at a desired location on the card. In operation, the card is transported to a reference position relative to the embossing wheel, the embossing wheel is rotated so that the desired character is at the appropriate point, and the desired character is embossed. The latter patents mentioned above offer improvements to the transport mechanism, the control system used to emboss a batch or series of cards, and variations involving multiple embossing wheels as well as additional processes involved in producing credit cards. In these inventions, each character is individually embossed, which consumes precious processing time, especially when the same characters are repeated on every card. Additionally, each embossing wheel typically has letters or characters of only one font or pitch width. If additional fonts or pitch widths are desired, multiple wheels are required, which can add cost and complexity to card production.

U.S. Pat. No. 4,091,910, issued to Bolton et al., discloses an electronically controlled embossing machine for embossing alpha-numeric characters on flexible sheets, such as plastic credit cards. The machine uses two constantly rotating embossing wheels which carry radially moveable embossing molds about their peripheries. One embossing wheel carries male or projecting embossing molds; the second wheel carries matching female or intaglio embossing molds. Selection of a desired character causes the appropriate male and female molds to move radially outward on each wheel. A credit card blank is disposed between the embossing wheels, where the rotating wheels cause the desired character to be embossed in the card through a rolling-squeezing process.

U.S. Pat. No. 4,747,706, issued to Duea, discloses another embossing method and apparatus that uses a rotatable embossing wheel. U.S. Pat. No. 4,519,600, issued to Warwick et al., discloses a card feeding, transfer and output apparatus for an automatic embossing system like those disclosed in the LaManna patents. U.S. Pat. No. 5,070,781, issued to Lundstrom et al., discloses a card embossing apparatus and method based on the LaManna patents. U.S. Pat. No. 4,384,711, issued to Gabel et al., discloses a card feeding apparatus for an automatic embossing system, like those disclosed in the LaManna patents.

U.S. Pat. No. 5,974,961, issued to Kazo et al., discloses a multi-hopper card embossing apparatus. The disclosed apparatus adds functionality to the embossing machines described above. The added functionality results from multiple input hoppers, wherein cards of different types can be staged prior to processing. This allows the apparatus to process the various cards without having to stop the machine and load new types of cards. However, the actual embossing mechanism is similar to those described above. Similarly, U.S. Pat. No. 5,920,055 discloses a card transport mechanism and method of operation, where the transport mechanism is suitable for use in the embossing systems described above.

U.S. Pat. No. 4,732,082, issued to Ireton, discloses a preassembled set of embossing rolls. The embossing rolls can emboss a reoccurring pattern onto a sheet of material that is fed through the rolls. The rollers have corresponding male and female dies that impart a three dimensional shape to a sheet of material disposed between the rolls.

U.S. Pat. No. 5,968,607, issued to Lovison, discloses a device and method for etch and emboss process printing. Lovison uses a series of rollers to emboss patterns into thick layers of ink on a sheet of material.

None of the inventions described above disclose a way to emboss information onto a sheet of material prior to the material being cut into individual cards. Nor do they disclose how cards with information embossed on them could be further processed to add additional information or undergo further embossing.

Thus there is a need to develop a system that can emboss information onto a sheet of material prior to the material being cut into individual cards. There is a further need to develop a system to process pre-embossed cards such that the cards do not stack tightly together, i.e., nest, and allow for further processing, such as individualized embossing, foiling, magnetic strip encoding, and the like.

SUMMARY OF THE INVENTION

In view of the insufficiencies discussed above, it is an object of the present invention to provide a system for embossing a sheet of material prior to the material being cut into individual cards.

It is a further object of the present invention to provide a method for creating cards having combinations of different types of items, either alphanumeric text or symbols, embossed into the cards.

It is a further object of the present invention to provide an apparatus for collecting embossed cards following being cut into individual cards such that the cards do not nest together when stacked.

It is a further object of the present invention to provide an apparatus for feeding embossed and cut cards into a printer for the printing of individualized information on the cards.

A method and system for making embossed cards is disclosed. First, static information can be printed on a sheet of material and a coating may be applied to the sheet. Next, the sheet is embossed with static information in a pattern of rows and columns, wherein embossing on adjacent columns is offset. Cards are then cut from the sheet and the cards are collected such that adjacent cards are offset from one another.

The cards may be further processed to add additional information or additional features to the cards. The additional information may include static or individualized information that is printed or embossed onto the cards. Other features include adding a foil layer to the cards, adding a magnetized strip to the cards, or adding special decals or images to the cards. The cards may also be secured to a carrier suitable for shipping or displaying the cards for retail sales.

In the embossing system, an embossing die and a receiving die are used to emboss information onto a sheet of material disposed between the dies. The information to be embossed is arranged in a pattern of rows and columns on the dies. The information for adjacent rows or columns is offset relative to one another. A card cutting apparatus is used to cut individual cards from the sheet of material. There is provided means for allowing the cards to fall into a receiving tray having a plurality of cells arranged in a pattern of rows and columns, wherein adjacently stacked cards have embossing which is offset from one another. The sheet can be made of polyvinyl chloride, cardstock, nylon, plastic, or any other material suitable for making credit, identification, promotional, or other cards of this type.

Other features and advantages of the invention will be apparent from the following detailed description take in conjunction with the following drawings, wherein like reference numeral represent like features.

DETAILED DESCRIPTION OF THE INVENTION

Figure 1:
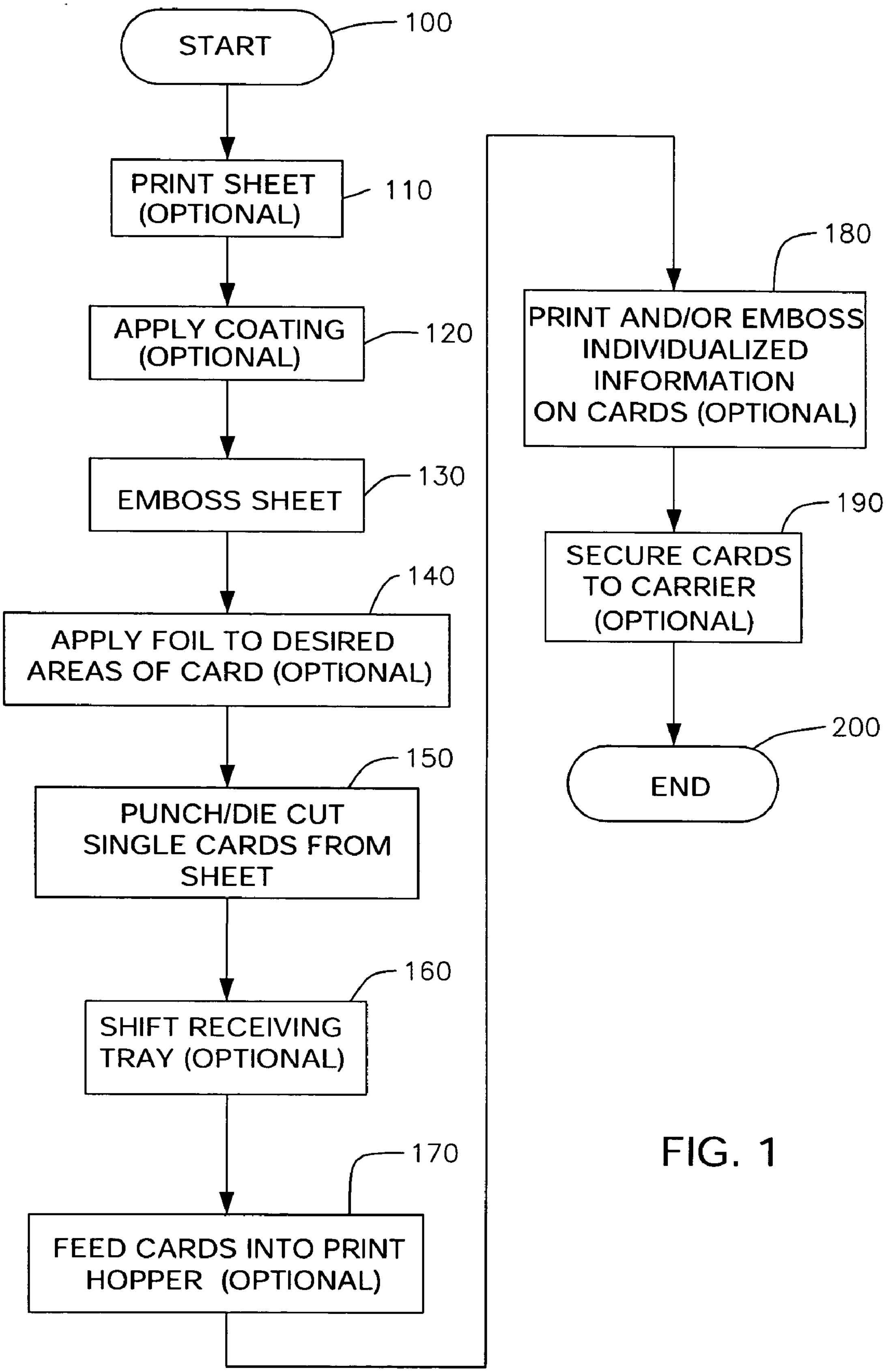
FIG. 1 schematically illustrates the process of the present invention.

While this invention is susceptible of embodiments in many different forms, there are shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

The present invention is a card embossing system. The process for the present invention is shown schematically in FIG. 1. The process starts at step 100. Step 110 shows the optional step of printing static information onto a sheet of material that is the underlying material for the cards. The underlying material can be polyvinyl chloride (PVC), cardstock, nylon, plastic, or any other material suitable for making credit, identification, promotional or other similar type cards. Static information is information, whether pictorial, colors, or text, that will be the same on all cards.

Next, a coating can be applied to the sheet, shown at step 120. This coating can be a coating to prevent card degradation from exposure to ultraviolet light, a lamination to protect the card, or a UV coating, all known in the art.

Figure 3:
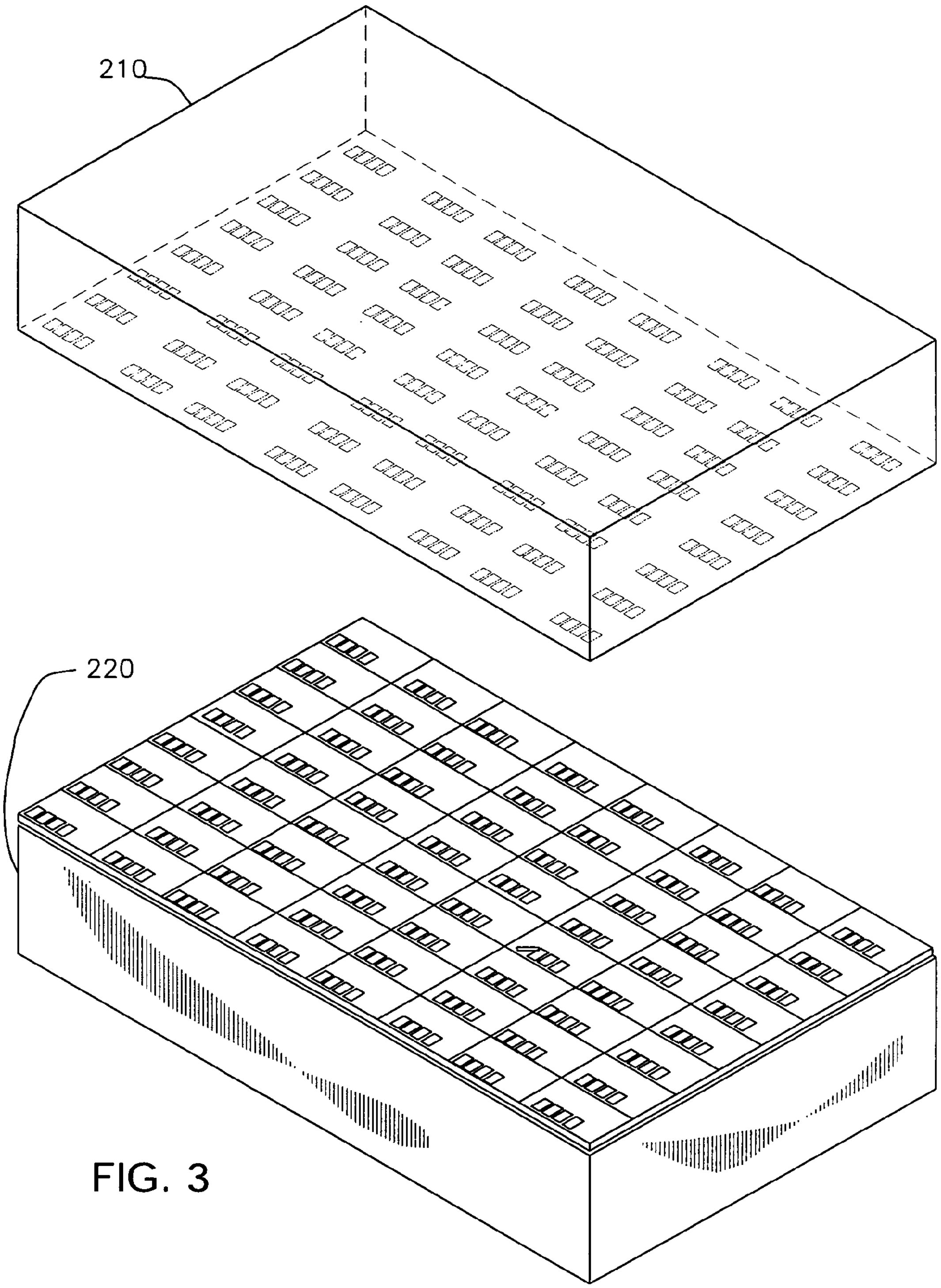
FIG. 3 is a perspective view of a die set of the present invention.

Following coating, the sheet is fed into an embossing apparatus, shown at step 130. The embossing apparatus of the present invention is designed to emboss static information onto an entire sheet of cards at one time. In various preferred embodiments the embossing apparatus is made up of an embossing die 210 and a receiving die 220, shown in FIG. 3. When the dies, 210 and 220, are brought together with the material to be embossed disposed between the dies 210 and 220, the information from the dies 210 and 220 is imparted to the material in the form of raised information. Optionally, the embossing die 210 and receiving die 220 can be configured, via computer system, not shown, to include individual embossing information for each card.

Figure 2:
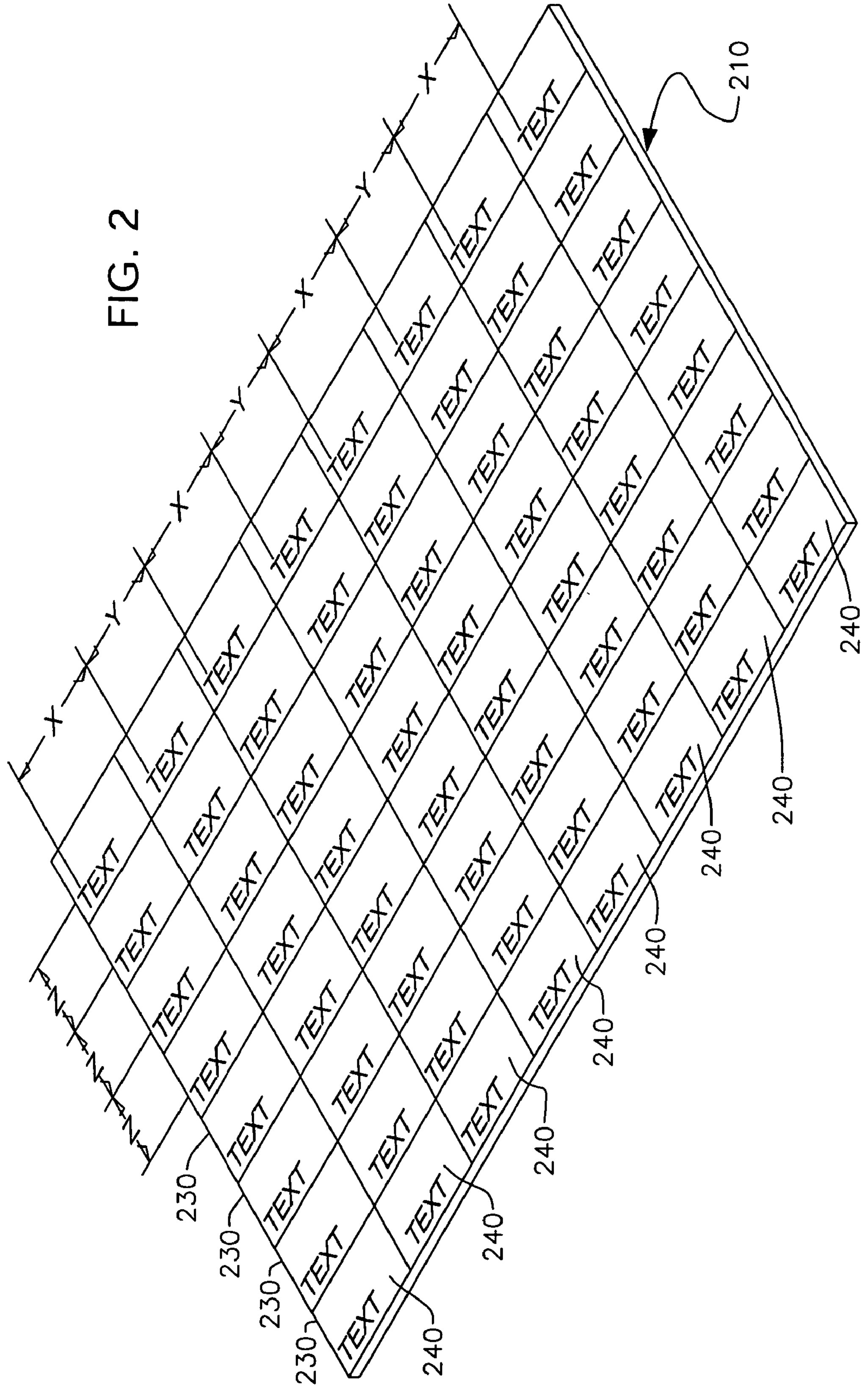
FIG. 2 is a perspective view of an embossing die of the present invention.

In the present invention, the information to be embossed is arranged on the dies 210 and 220 into a plurality of rows 230 and columns 240. The rows 230 can be evenly spaced from one another. The distance between columns 240 varies from column 240 to column 240. FIG. 2 shows a sample spacing arrangement for an embossing die 210. The embossing die 210 shown is designed to emboss information for a total of sixty-four (64) cards, arranged in eight (8) rows 230 and eight (8) columns 240, however, any suitable number of rows 230 or columns 240 could be used. The rows 230 are spaced a desired distance, z, apart. The distance between columns 240 alternates from a desired distance x and a desired distance y. By alternating the spacing between columns 240 the information on adjacent columns 240 is offset relative to each other. In various preferred embodiments, every other column 240 will be aligned identically. For example, columns 1, 3, 5, and 7 will produce identical cards, and columns 2, 4, 6, and 8 will produce cards which are identical to one another, but having embossment which is offset from the first set of columns 240. Other patterns can be used in order to create offset embossing, including varying the spacing of the rows 230.

Figure 4:
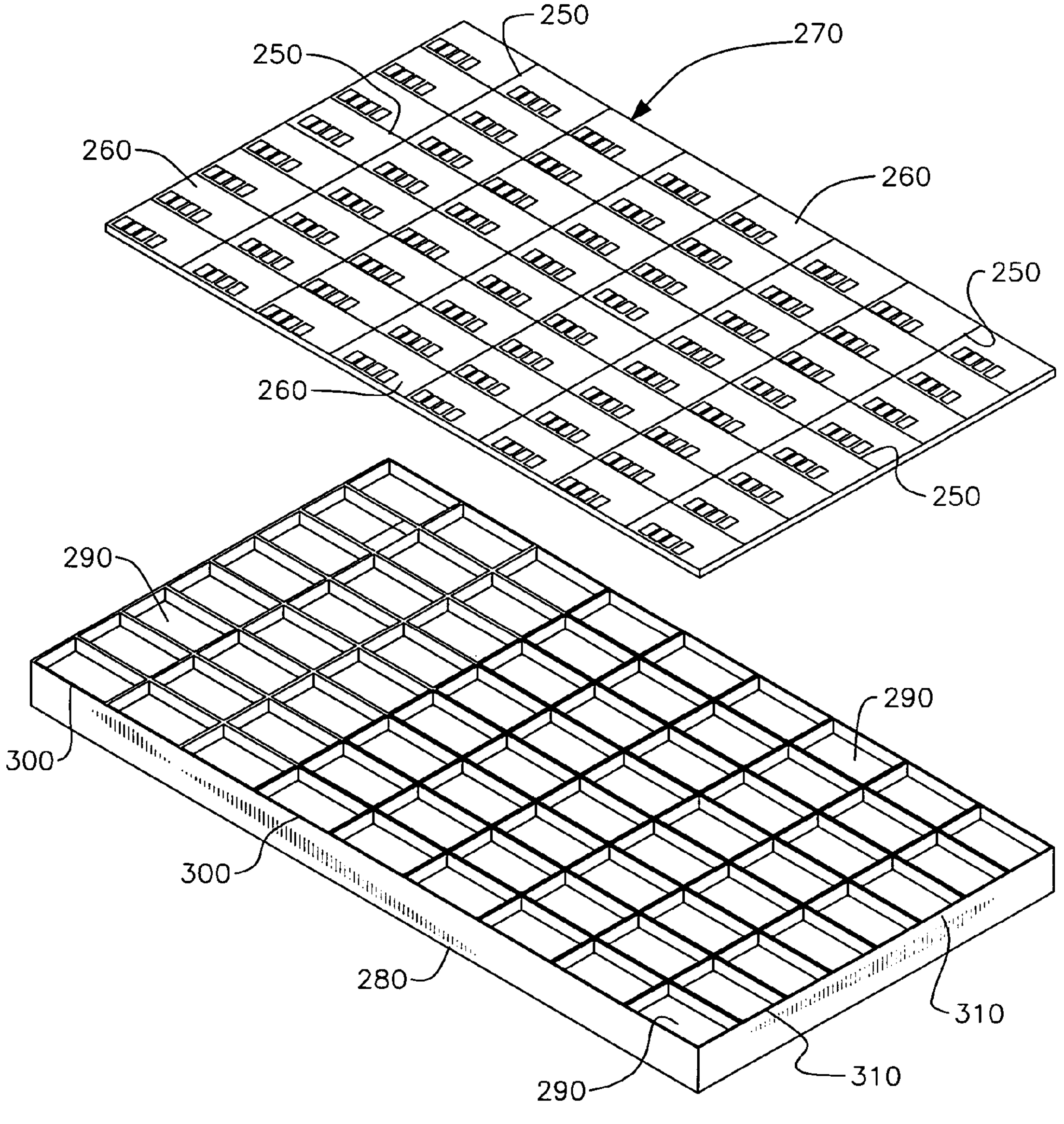
FIG. 4 is a perspective view of a tray for receiving cut cards of the present invention.

After embossing at step 130, individual cards 260 are cut or punched out from the sheet of material 270. The cutting apparatus, known in the art and not shown, cuts the sheet 270 into the desired number of cards 260. FIG. 4 shows the cutting lines 250 to cut the sheet 270 into sixty-four (64) equal sized cards 260. Once cut, the cards 260 fall into a receiving tray 280. The receiving tray 280 is designed to have cells 290 into which the cut cards 260 fall. In various preferred embodiments, the receiving tray 280 has at least one more column 300 of cells 290 than the number of columns 240 of cards 260 to be cut per sheet 270. For example, in the embodiment of eight rows 230 and eight columns 240, the receiving tray 280 would have nine or more columns 300 of cells 290. Again, the designation of rows 230 and columns 240 is arbitrary, in so far as the receiving tray 280 may have at least one additional row 310 when the distance between rows 230 is variable and the distance between columns 240 remains fixed.

The cards 260 are collected by any suitable means to insure that adjacent cards 260 have offset embossing. In one preferred embodiment, the receiving tray 280 is jogged one column 300 after each sheet 270 is cut. When the next sheet 270 is cut, a card 260 from an alternate column 240 will fall into each cell 290. As discussed above, the embossing on alternate columns 240 is slightly offset. Thus when cards 260 from alternate columns 240 fall into the same cell 290, they do not nest. That is to say, they do not tightly stack against each other. The offset embossing prevents the cards 260 from stacking tightly as the raised information holds adjacent cards 260 slightly apart.

Figure 5:
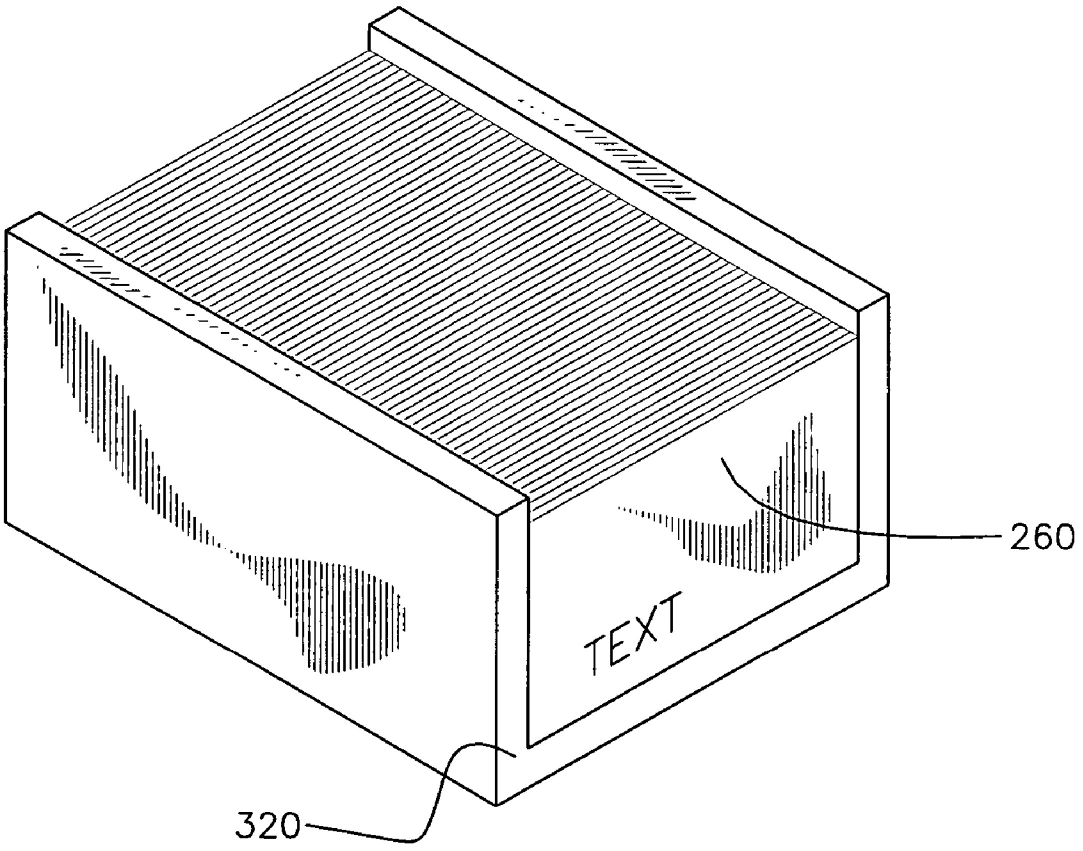
FIG. 5 is a perspective view of a card hopper of the present invention.

At step 170, the cards 260 can be placed in a hopper 320 for additional processing. One possible type of hopper 320 is shown in FIG. 5. In this hopper 320 the cards 260 are positioned up on edge, in a generally vertical orientation. The cards 260 move horizontally inside the hopper 320. At one end of the hopper they are fed into a machine for processing, shown at step 180. The additional processing can include printing of additional information onto the card 260. For this, the cards 260 are fed into a commercial printer, such as a high speed inkjet printer, not shown, designed to print on cards of this type. Either static information, personalized information, or both can be applied to the cards 260 via printing. The offset nature of the embossing on adjacent cards 260 allows for improved feeding from the hopper 320. The improved feeding comes from the lower amount of force that is required to remove a single card 260 from the hopper 320. This improved feeding can reduce the frequency ofjamming or feeding problems.

The cards 260 may also be fed into a machine for individualized embossing, not shown. The machine may be of the type described above, where individual information is embossed one character at a time using computer controlled embossing wheels. The embossing from the embossing process of the present invention improves performance of the individual embossing machine in two ways. First, static information does not have to be embossed onto the cards, which saves processing time and reduced wear in the machine. Second, the offset nature of the embossing process of the present invention improves the operation of the machine by requiring a lower amount of force to remove a single card 260 from the hopper 320 that is used to feed cards 260 into the machine.

Lastly, the cards can be secured, by glue or other means, to a carrier and prepared for delivery, shown at step 190. Carriers and securing cards to carriers with glue are known in the art. The process ends at step 200.

The process may include additional steps. For example, a metallic or metallic looking foil layer may be applied to the cards such that the embossed information appears “chromed” or shiny in appearance, shown at step 140. This step is shown between the embossing step 130 and cutting step 150 in FIG. 1. However, the foiling step 140 may occur earlier or later in the process without affecting the process of the invention. Additionally, other features may be added to the cards in the process. For example, a magnetized strip, not shown, may be added to the cards 260. Similarly, special logos or decals, such as a holographic image, not shown, may be added to the cards 260.

While specific embodiments have been illustrated and described, numerous modifications come to mind without significantly departing from the spirit of the invention, and the scope of protection is only limited by the scope of the accompanying claims.

What is claimed is:

1. A method of making embossed cards comprising the steps of:

printing static information on a sheet of material, applying a coating to said sheet, embossing said sheet with static information in a pattern of rows and columns, wherein embossing on adjacent columns is offset, cutting cards from said sheet so that each card contains static information, and stacking said cards, wherein the static information on each stacked card is offset from the same static information on the next card in the stack.

2. The method according to claim 1, further comprising the step of processing said cards to add additional information to said cards.

3. The method according to claim 2, wherein said processing step comprises feeding said cards into a hopper.

4. The method according to claim 2, wherein said processing step comprises printing additional information on said cards.

5. The method according to claim 4, wherein said processing step further comprises printing individualized information on said cards.

6. The method according to claim 3, wherein said processing step further comprises printing additional information on said cards.

7. The method according to claim 6, wherein said processing step further comprises printing individualized information on said cards.

8. The method according to claim 2, wherein said processing step further comprises embossing additional information on said cards.

9. The method according to claim 8, wherein said processing step further comprises embossing individualized information on said cards.

10. The method according to claim 3, wherein said processing step further comprises embossing additional information on said cards.

11. The method according to claim 10, wherein said processing step further comprises embossing individualized information on said cards.

12. The method according to claim 1, further comprising the step of applying foil to said sheet.

13. The method according to claim 1, further comprising adding a magnetized strip to said cards.

14. The method of claim 1, further comprising the step of applying foil to said cards.

15. The method according to claim 1, further comprising the step of attaching said cards to a carrier.

16. The method of claim 15, wherein said attaching step comprises gluing said cards to a carrier.

* * * * *